United States Patent [19]

Hayes et al.

[11] Patent Number: 4,853,123

[45] Date of Patent: Aug. 1, 1989

[54] COMPLETELY SEALED FUEL FILTER AND METHOD OF MAKING SAME

[75] Inventors: Mark B. Hayes, Mt. Clemens; Daniel Scanlon, Detroit, both of Mich.

[73] Assignee: Cusolar Industries, Inc., Mt. Clemens, Mich.

[21] Appl. No.: 219,185

[22] Filed: Jul. 15, 1988

[51] Int. Cl.$^4$ ............................................. B01D 29/14
[52] U.S. Cl. .................................... 210/316; 210/335; 210/342; 210/416.4; 210/461; 210/499; 156/73.1; 156/294
[58] Field of Search ............... 210/315, 316, 335, 342, 210/416.4, 452, 460, 461, 483, 489, 497.01, 499; 156/73.1, 294

[56] References Cited

U.S. PATENT DOCUMENTS

| | | | |
|---|---|---|---|
| 47,074 | 3/1865 | Andries | 210/460 |
| 169,092 | 10/1875 | Dillon | 210/315 |
| 234,408 | 11/1880 | Jennings | 210/335 |
| 856,832 | 6/1907 | Anderson | 210/489 |
| 1,044,601 | 11/1912 | Thiem | 210/489 |
| 1,633,709 | 6/1927 | Naugle | 210/467 |
| 2,367,055 | 1/1945 | Rike et al. | 210/416.4 |
| 2,419,501 | 4/1947 | Pinto | 210/452 |
| 2,757,800 | 8/1956 | Kucera | 210/316 |
| 4,250,039 | 2/1981 | Cozzi et al. | 210/452 |
| 4,303,513 | 12/1981 | Lindquist | 210/132 |
| 4,304,664 | 12/1981 | McAlindon et al. | 210/172 |
| 4,391,716 | 7/1983 | McCurry | 210/799 |

FOREIGN PATENT DOCUMENTS

| | | |
|---|---|---|
| 372606 | 3/1922 | Fed. Rep. of Germany . |
| 21690 | 11/1905 | Sweden . |
| 169591 | 10/1921 | United Kingdom . |
| 636439 | 4/1950 | United Kingdom . |

OTHER PUBLICATIONS

Publication of Society of Automotive Engineers, Inc. of 400 Commonwealth Drive, Warrendale, PA 15096, entitled "SAE Technical Paper Series—The Parameters that Control the Performance of the In-Tank Fuel Strainer", by Carl E. Miller, Paper Series No. 790091, Copyright 1979 (16 pages).

Publication of Society of Automotive Engineers, Inc. of 400 Commonwealth Drive, Warrendale, PA 15096, entitled "SAE Technical Paper Series—Reducing Low Temperature Wax Plugging in Fuel Sustems of the Diesel Passenger Car", by J. W. Muzatko, Paper Series No. 800222, Copyright 1980 (20 pages).

*Primary Examiner*—Richard V. Fisher
*Assistant Examiner*—Christopher Upton
*Attorney, Agent, or Firm*—Dykema Gossett

[57] ABSTRACT

A completely sealed fuel filter comprises an open mesh support and a closed tubular perforate body covering the support of a material having openings there throughout its surface sufficiently small in the micron range so as to pass fuel therethrough, but not aqueous solutions present in fuel and contaminants. The body has an outlet. A connector surrounds the outlet and is secured to the body adapted for coupling the filter to the inlet of a fuel pump. An outlet patch of a material with openings in the micron range as the body spans and covers the outlet and is peripherally secured to the body to thereby completely seal the filter. The method of making a completely sealed filter comprises of steps of providing an open mesh support, enclosing the support with a closed tubular perforate body of a material having openings throughout its surface sufficiently small in the micron range so as to pass fuel therethrough, but not aqueous solutions present in fuel and contaminants, the body having an outlet; mounting and securing a connector upon the body over its outlet and mounting and securing a filter patch to the body over its outlet of a material with openings in the micron range as the body, which spans and covers the outlet, and thereafter peripherally sealing the filter patch to the body by ultrasonics.

22 Claims, 1 Drawing Sheet

U.S. Patent
Aug. 1, 1989
4,853,123
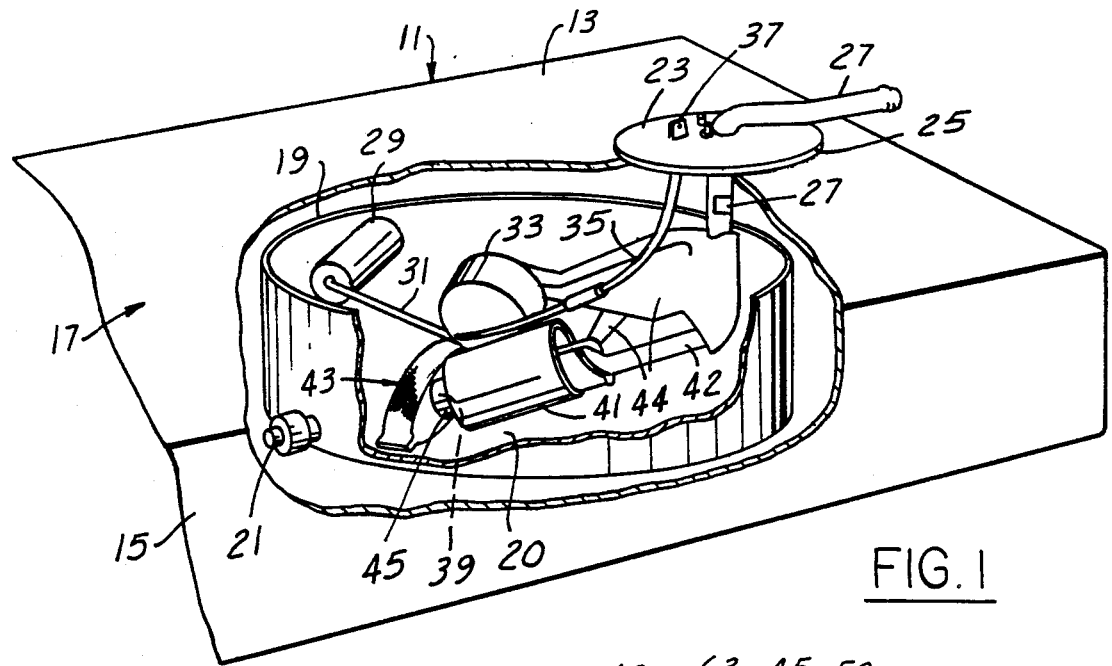
FIG. 1
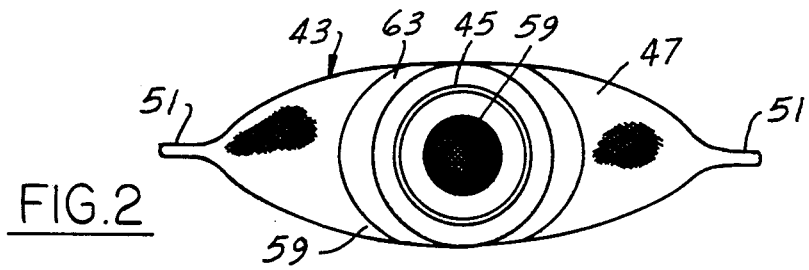
FIG. 2
FIG. 3
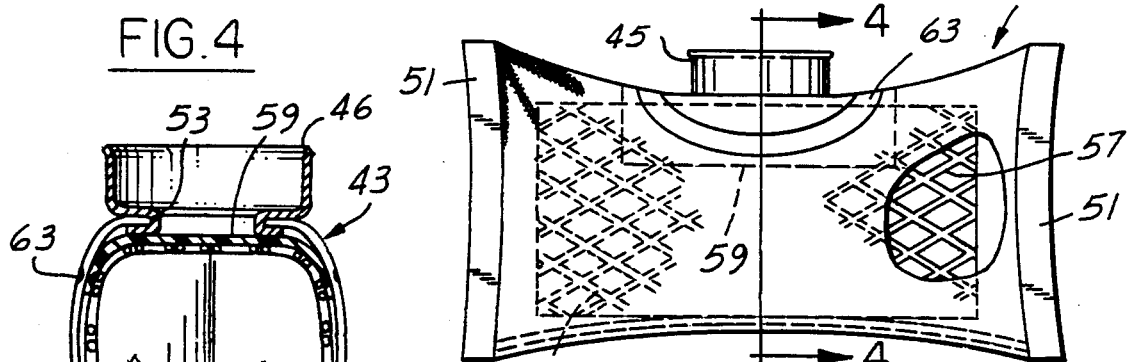
FIG. 4
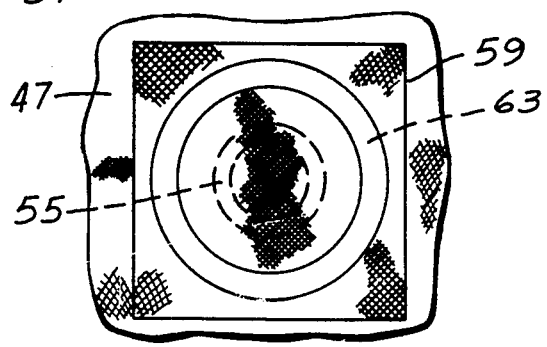
FIG. 5

COMPLETELY SEALED FUEL FILTER AND METHOD OF MAKING SAME

FIELD OF INVENTION

The present invention relates to fuel filters or strainers such as used in a fuel tank, and more particularly to a completely sealed fuel filter and to the method of making same.

BACKGROUND OF THE INVENTION

It is well known that the life expectancy of a well-designed engine, correctly operated, tuned and lubricated, depends to a large extent on how well its running conditions are adapted to the filtration of air, fuel and oil. The methods of filtration employed, as an example in automotive engines, are determined by the minimum efficiency required for each type of engine and the nature of the contaminating materials. It is also well known that the presence of water and suspended solid debris or other contaminants in diesel and gasoline injection fuel delivery systems causes severe damage to delicate injection pumps and injector nozzles. Experience has shown as much care and vigilance must be given to the design of a fuel delivery filtration system so that of air and oil if the engine is to perform satisfactorily.

An important purpose of in-tank fuel strainers or filters is to serve as impermeable barriers to aqueous solutions as present in fuel and suspended debris whose presence within the engine could cause excessive wear or malfunction of the engine parts. Fuel filters also provide two other equally important functions in high speed compressive engines of the automotive type. First, they exclude entry of air into the fuel stream whenever the air-fuel interface is below the entrance of the fuel pick-up tube. Finally, variable fuel consumption requirements of the engine mean that the filter must act as a conduit and transmit sufficient fuel to the engine for all operating conditions, even though the fuel level is low.

The filter or strainer design, used as standard equipment on many American vehicles, is a square mesh plain-weave fabric sleeve attached to the fuel pump or the fuel pick-up line. The fabric sleeve has on its interior a tubular mesh support of the type employed in the present invention. Th textile fabric employed in the prior art as well as in the present invention is usually made from Saran (TM) polyester fabric or from polyvinylidene chloride (PVdC) thread because such polymers do not swell or decompose when immersed in hydrocarbons and water. A variety of PVdC and PVdC polyester reinforced fabrics are commercially available and have been used to alter the basic filter design for specific vehicle applications.

A problem with existing fuel filters of the type described has been that the connector outlet of the filter has not been sealed with the results that contaminants or debris upon or within the interior of the filter pass through the filter outlet with the gasoline into the fuel delivery system to thereby cause damage to the delicate injunction pumps, fuel pumps and injector nozzles. It is possible for debris or contaminants to get into the interior of the fuel filter as a result of edges or chips breaking off from the open mesh plastic support located within the fabric body. In addition, it is possible for contaminants to get into the interior of the filter at the time the filter is manufactured even though care is usually taken to prevent such contamination of the fuel filter. The internal support can be broken at the time the filter is installed within the fuel tank reservoir or when it is used in a free floating environment as in U.S. Pat. No. 4,303,513. Thus, any contaminants which accumulate within the interior of the filter is free to pass along with the gasoline or fuel through the non-filtered outlet into the fuel line resulting in clogged fuel pumps, ejectors and other malfunctions of the vehicle engine.

A filter of the general type disclosed herein, is shown in the Robert J. Lundquist's U.S. Pat. No. 4,303,513, dated Dec. 1, 1981 entitled "Duel Pick-up Fuel Strainer Assembly".

SUMMARY OF THE INVENTION

An important feature of the present invention is to provide a completely sealed fuel filter so that any contaminants or debris or particles which may have accumulated within the interior of the fuel filter will be blocked from passing outwardly therefrom through the filter outlet to the intake of a fuel pump or to the inlet of a fuel pick-up tube or other fuel lines.

Another feature of the present invention is to provide a completely sealed fuel filter which includes an open mesh support together with a closed tubular perforate body which covers the support and is constructed of material having openings throughout its surface sufficiently small in the micron range so as to pass fuel therethrough but not aqueous solutions present in fuel or contaminants. In such a construction the filter outlet is provided with a filter patch of a material with openings also in the micron range which spans and covers the outlet and is peripherally secured to the body to thereby completely seal the filter.

Still another feature of the present invention is that the openings in the material defining the filter body and the filter patch are sufficiently small in the micron range of 30 to 300 microns, preferably 70 to 77 microns for the body and 200 microns for the filter patch in the illustrative embodiment, such as will permit the passage of fuel therethrough but not aqueous solutions present in fuel or contaminants and with the filter patch further protecting the outlet by preventing any contaminants within the interior of the filter from escaping through the filtered outlet.

A further feature of the present invention is to provide a completely sealed fuel filter comprising an open mesh support open at its ends, a closed tubular perforate body covering the support, of a material having openings throughout its surface sufficiently small in the micron range so as to pass fuel therethrough, but not aqueous solutions present in fuel and contaminants, with the body having an outlet, a connector surrounding the outlet and secured to the body adapted for coupling the filter to the inlet of a fuel pump or line, and a filter outlet patch of a material with openings in the micron range as the body spanning and covering the outlet and peripherally secured to the body to thereby completely seal the filter.

Another feature of the present invention is to provide a completely sealed fuel filter of the aforementioned type wherein the opposite sides of the body across opposite ends are flattened and sealed and further wherein the body is rolled into a tube with its longitudinal edges overlapped and sealed together, with the sealing being achieved by ultrasonic sealing or by heat sealing.

A still further feature of the present invention is to provide a method of making a completely sealed fuel filter of the aforementioned type wherein the filter patch is peripherally secured to the body by ultrasonic sealing.

These and other features and objects will be seen from the following specification and claims in conjunction with the appended drawings.

IN THE DRAWINGS

FIG. 1 is a fragmentary perspective partly broken away illustration of a fuel tank with reservoir and with the present completely sealed fuel filter emersed within the fuel therein and connected to an electric fuel pump.

FIG. 2 is a plan view of the present completely sealed filter shown in FIG. 1, and on an increased scale.

FIG. 3 is a side elevational view thereof, partly broken away to illustrate the construction of the open mesh support.

FIG. 4 is a section taken in the direction of arrows 4—4 of FIG. 3, and on an increased scale.

FIG. 5 is a fragmentary plan view of the filter shown in FIG. 3, the body of the filter being broken away and with the filter patch secured and sealed in place upon the interior of the filter body.

It will be understood that the above drawings illustrate merely a preferred embodiment of the invention, and that other embodiments are contemplated within the scope of the claims hereafter set forth.

DETAILED DESCRIPTION OF THE PREFERRED EMBODIMENT OF THE INVENTION

Referring now to the drawing, vehicle fuel tank 11 is shown in FIG. 1 and is made of a plastic material or metal. Tank 11 includes a top wall 13, bottom wall 15 and a fuel chamber 17. In the illustrative embodiment positioned within fuel tank 11 and within the fuel chamber 17 is a fuel reservoir 19 having a bottom wall 20 and adjacent thereto a valved inlet 21 by which the reservoir 19 is filled with fuel to the level of the fuel within the basic fuel chamber 17.

Cap 23 is sealed and secured over the opening 25 in the top wall of tank 11 and receives and supports a portion of the fuel pick-up tube 27, fragmentarily shown, adapting or delivering fuel from the tank 11 or reservoir 19 to the vehicle engine or to a fuel pump connected therewith. As is conventional there is provide a fuel level float 29 within the fuel reservoir 19 upon one end of the pivotal float arm 31. The arm 31 is connected to the electric sensor 33 of a conventional construction. Electrical lead 35 from the sensor 33 is connected to cap 23 and terminates in the connector 37 adapted for connection to a dashboard or other indicator in the vehicle for a calibrated reading as to the fuel level within the tank 11 or reservoir 19. Positioned within reservoir 19 in the illustrative embodiment is an electric gas pump 41 of a conventional construction supplied, as an example, by Walbro Company. The pump 41 is suspended from bracket 44 and has an inlet 39 at one end over which is fitted and secured the filter connector 45 of the present completely sealed filter 43.

As is conventional the electric gas pump or fuel pump 41 has an outlet tubing 42 which connects with a fuel pick-up tube 27 which projects through the tank cap 23, FIG. 1.

Construction of the present completely sealed filter 43 is shown in greater detail in FIGS. 2, 3, 4 and 5. The present completely sealed filter 43 includes a closed body 47 of tubular form but which could be of any other desired form such as cylindrical, oval, round, kidney shape or any other geometrical shape, but nevertheless is sometimes referred to as a closed tubular perforate body 47. The body 47 is constructed of a plastic filter material having openings throughout its surface sufficiently small in the micron range so as to pass fuel therethrough, but not water or any other contaminants. In the illustrative embodiment the body 47 is constructed of a plstic filter material or cloth such as a Saran (TM) polyester fabric perforated throughout with about 77 micron openings. The openings for the filter material are within the range of 30 to 300 microns and in the illustrative embodiment are 70 to 77 microns. Filter material may be a polyvinylidene chloride, PVdC or a PVdC with a polyester reinforced fabric particularly adaptable for gasoline fuel, for illustration, but which will exclude the passage of water or other contaminants therethrough. The present material of the body 47 is inert to hydrocarbons such as gas and does not swell or change shape when immersed in gasoline or diesel fuel.

The present completely sealed fuel filter 43 includes the closed tubular perforate body 47 which an illustrative embodiment has been rolled into a tube FIG. 3 and 4, with its longitudinal edges overlapped as at 49 and sealed together. The longitudinal edges are ultrasonically sealed at 49 of the illustrative embodiment or could be heat sealed. The opposite sides of the body 47 across opposite ends are flattened together at 51 and similarly ultrasonically sealed together completing the closure of the tubular body 47.

In the illustrative embodiment a circular outlet opening 53 is formed through the body 47 intermediate in ends and is adapted to have projected thereinto the metallic filter connector 45 of annular form, FIG. 4, whose free edges are out-turned and crimped over adjacent portions of the body material as at 55 for firmly securing the filter connector 45 in position upon the body 47.

The outer portion of the filter connector 45 is flared outwardly as at 46 to facilitate assembly and securing over the pump inlet 39, shown in dash lines for the electric fuel pump 41 in FIG. 1.

The filter body 47 and its assembly with the connector 45 is such as to withstand a pull-off force, as an example, of 15 pounds approximately opposite the direction of assembly with respect to the pump 41.

The present completely sealed fuel filter 43 includes upon the interior of the body 47 an elongated open mesh support 57 of a plastic material such as polypropylene with a 0.76-1.27 diameter open mesh construction and with opposite ends of the support open as shown in FIGS. 3 and 4. The resilient support 57 is supportive of the filter body 47 to maintain the form thereof.

Mounted upon the interior of the filter body 47 and spanning and covering the filter outlet 53 is a filter outlet patch 59. The patch 59, as an example, is constructed of a different material than the filter material forming the body 47 and has openings in the micron size of 200 microns approximately. It is contemplated that the range of microns for the filter patch could be within 30 to 300 microns as is the material for the body. In the illustrative embodiment it has been found that the patch 59 of square shape or configuration is best as it is shown in its overlap relationship in FIG. 5 with respect to outlet opening 53 within the filter body 47. In the assembly of the patch 59 upon the interior of the body and securing thereto it has been found that the square shape of patch is better than other shapes and is less likely to slip from the located position. In the position shown the patch 59 surrounds the opening 53 and is peripherally secured to the body throughout 360 degrees by a suitable seal such as the ultrasonic weld or seal 63, FIG. 5. As shown in the illustrative embodiment the patch 59 is located upon the interior of body 47, extends across and provides a filter covering for the outlet opening 53 of filter 43. This ensures that should any impurities or contaminants or aqueous solutions present in fuel or plastic bits or chips be located within the interior of the filter 43, none of such material 70 to 77 microns or larger can pass through the outlet opening 53 due to the location of the filter outlet patch 59 over the opening 53 and through which all fuel must pass to enter the fuel system.

In the illustrative embodiment the present completely sealed fuel filter 43 is confined within the fuel reservoir 19 mounted at 39 upon one end of the electric fuel pump 41. Thus it is isolated from the fuel or gas within chamber 17 of fuel tank 11. Alternately the fuel filter 43 may be free floating positioned adjacent the bottom of the tank 13 so as to be able to pick-up fuel regardless of the inclination of the vehicle when traveling over inclines or hills or mountains.

It is also contemplated that the present completely sealed fuel filter 43 could be employed in a non-automotive environment since the primary objective is to provide a completely sealed fuel filter of material having openings through its surface sufficiently small in the 70 micron size, namely in the range 30 to 300 so as to pass fuel therethrough but not aqueous solutions present in fuel or other contaminants.

Depending upon the purpose to which the present completely sealed fuel filter 43 is used the filter could be of any desired configuration such as tubular or cylindrical as shown, oval, round or kidney shaped or any other geometrical shape.

With respect to the securing of the filter material to the shape of the filter shown, FIG. 2-5 the respective longitudinal edges are ultrasonically sealed as at 49 as a double fold, FIG. 4. The respective flattened ends 51 are ultrasonically sealed together across their width as shown in FIG. 3 and the corresponding filter outlet patch 59 is similarly ultrasonically sealed as at 63 across the outlet opening 53 formed within the tubular body 47, as in FIGS. 2, 4 and 5. One of the primary purposes of the present completely sealed fuel filter 43 is to prevent the passage of water into the fuel line. In present day constructions of plastic gas tanks and plastic reservoirs it is always possible that flash particles of plastic could get into the gasoline. The present completely sealed fuel filter prevents any such particles from passing into the fuel filters, fuel line or into the gas pump 41 and into the intake pipe 27 which leads to the vehicle engine for illustration. In the event plastic bits or pieces from the plastic support 57 should break off from the support, or otherwise enter the interior of the filter 43, the filter patch 59 over the outlet opening 54 will prevent such contaminants from leaving the filter and entering the fuel pump and system.

While ultrasonic welding has been disclosed as to the best method of seal such as shown at 49 and 51 and at 63, it is contemplated other forms such as heat sealing could be employed.

In the illustrative embodiment the present completely sealed fuel filter 43 is mounted over the inlet 39 of the elastic fuel pump 41 in FIG. 1. It is contemplated that the filter could be connected to one end of a fuel pick-up tube 27 which projects into the interior of a gasoline tank or the reservoir therein.

In accordance of the present invention the body 47 may be a completely closed tubular and perforate body wherein the connector 45 is mounted upon any exterior surface portion thereof and secured thereto without passing through an outlet opening thereby communicating with the interior of the filter through the material which forms the filter body. As the connector 45 is mounted over a portion of and secured to the body 47 the connector 45 defines an outlet adapted for communicating with the interior of the body through the openings of the material coupling the filter 43 to the inlet of a fuel pump 41 as in FIG. 1.

As is known in the art, a protective removable cap, not shown, is usually placed on the connector 43 after manufacture of the filter 43. The cap is removed prior to installing the filter in the fuel system. The purpose of the cap is to prevent debris from entering the interior of the filter.

Having described our invention reference should now be had to the following claims.

We claim:

1. A completely sealed fuel filter comprising an open mesh support open at its ends;
   a closed tubular perforate body covering said support, of a material having openings throughout its surface sufficiently small in the micron range so as to pass fuel therethrough, but not aqueous solutions present in fuel and contaminants;
   said body having an outlet, said outlet generally extending on a first axis;
   a connector surrounding the outlet and secured to said body adapted for coupling the filter to the inlet of a fuel pump, with said outlet adapted to communicate with the pump inlet; and
   a filter outlet patch made of a material having openings in the same micron range as said body, spanning and covering said outlet and peripherally secured to said body to thereby completely seal the filter, said filter outlet patch being transverse to said first axis.

2. In the fuel filter of claim 1, said range of openings for said body and patch being 30 to 300 microns.

3. In the fuel filter of claim 2, said openings being 70 microns, approximately for said body and 200 microns for said patch.

4. In the fuel filter of claim 1, said body being of a shape selected from a group consisting of cylindrical, oval, round and kidney shape.

5. In the fuel filter of claim 1, the opposite sides of said body across its opposite ends being flattened together and sealed.

6. In the fuel filter of claim 5, said opposite ends being ultrasonically sealed.

7. In the fuel filter of claim 5, said body being rolled into a tube with its longitudinal edges overlapped and sealed together;
   said longitudinal edges being ultrasonically sealed.

8. In the fuel filter of claim 1, said body being rolled into a tube with its longitudinal edges overlapped and sealed together.

9. In the fuel filter of claim 1, said patch being square and peripherally sealed to said body.

10. A completely sealed fuel filter comprising a cylindrical open mesh support open at its ends;

a closed tubular perforate body covering said support, of a material having openings throughout its surface sufficiently small in the micron range so as to pass fuel therethrough, but not aqueous solutions present in fuel and contaminants;

said body having an outlet;

a connector surrounding the outlet and secured to said body adapted for coupling the filter to the inlet of a fuel pick-up tube, with said outlet adapted to communicate with the tube inlet; and a filter outlet patch made of a material having openings in the same micron range as said body spanning and covering said outlet and secured to the inner periphery of said body and overlying said support at the outer periphery to thereby completely seal the filter.

11. In the fuel filter of claim 10, said range of openings for said body and patch being 30 to 300 microns.

12. In the fuel filter of claim 11, said openings being 70 microns, approximately for said body and 200 microns for said patch.

13. In the fuel filter of claim 10, the opposite sides of said body across its opposite ends being flattened together and sealed.

14. In the fuel filter of claim 10, said body being rolled into a tube with its longitudinal edges overlapped and sealed together.

15. A completely sealed fuel filter comprising an open mesh support open at its ends;

a closed tubular perforate body covering said support, of a material having openings throughout its surface sufficiently small in the micron range so as to pass fuel therethrough, but not aqueous solutions present in fuel and contaminants;

said body having an outlet, said outlet generally extending on a first axis;

a connector surrounding the outlet and secured to said body adapted for coupling the filter to an inlet pipe, with said outlet adapted to communicate with the pipe inlet; and a filter outlet patch of material with openings in same micron range as said body spanning and covering said outlet and peripherally secured to said body to thereby completely seal the filter, said filter outlet patch being generally transverse to said first axis.

16. In the fuel filter of claim 15, said range of openings for said body and patch being 30 to 300 microns.

17. In the fuel filter of claim 16, said openings being 70 microns, approximately for said body and 200 microns for said patch.

18. In the fuel filter of claim 15, the opposite sides of said body across its opposite ends being flattened together and sealed.

19. In the fuel filter of claim 15, said body being rolled into a tube with its longitudinal edges overlapped and sealed together.

20. The method of making a completely sealed fuel filter, comprising the steps of:

providing an open mesh support open at its ends;

enclosing the support with a tubular closed perforate body constructed of a material having openings throughout its surface sufficiently small in the micron range so as to pass fuel therethrough, but not aqueous solutions present in fuel and contaminants;

providing an outlet in said body;

mounting a connector over the outlet and securing it to said body;

positioning an outlet patch of a material with openings in the same micron range as the body to the inner periphery of the body to span and cover said outlet and overlie the support; and ultrasonically sealing and peripherally securing the patch to the body.

21. In the method of claim 20, said range of openings for said body and patch being 30 to 300 microns.

22. In the method of claim 21, said openings being 70 microns, approximately for said body and 200 microns for said patch.

* * * * *